(12) United States Patent
Furukawa et al.

(10) Patent No.: US 9,093,713 B2
(45) Date of Patent: Jul. 28, 2015

(54) METHOD FOR PRODUCING LEAD-BASE ALLOY GRID FOR LEAD-ACID BATTERY

(75) Inventors: Jun Furukawa, Iwaki (JP); Kazuo Matsushita, Iwaki (JP)

(73) Assignee: THE FURUKAWA BATTERY CO., LTD., Yokohama-shi, Kanagawa (JP)

( * ) Notice: Subject to any disclaimer, the term of this patent is extended or adjusted under 35 U.S.C. 154(b) by 1015 days.

(21) Appl. No.: 12/536,686

(22) Filed: Aug. 6, 2009

(65) Prior Publication Data

US 2009/0293996 A1    Dec. 3, 2009

Related U.S. Application Data

(63) Continuation of application No. PCT/JP2008/070244, filed on Oct. 30, 2008.

(30) Foreign Application Priority Data

Nov. 5, 2007    (JP) ................................. 2007-287121

(51) Int. Cl.
   *H01M 4/82*      (2006.01)
   *C22C 11/06*    (2006.01)
   *C22F 1/12*      (2006.01)
   *H01M 4/68*      (2006.01)

(52) U.S. Cl.
   CPC ............... *H01M 4/82* (2013.01); *C22C 11/06* (2013.01); *C22F 1/12* (2013.01); *H01M 4/685* (2013.01)

(58) Field of Classification Search
   CPC ........ H01M 4/82; H01M 4/685; C22C 11/06; C22F 1/12
   USPC ........................................ 429/245; 420/565
   IPC ..................................... C22F 1/12; C22C 11/00
   See application file for complete search history.

(56) References Cited

U.S. PATENT DOCUMENTS

| 5,024,908 A | 6/1991 | Terada et al. |
| 6,117,594 A | 9/2000 | Taylor et al. |
| 6,423,451 B1 * | 7/2002 | Larsen ........................... 429/245 |
| 7,862,931 B2 | 1/2011 | Furukawa et al. |
| 2002/0088515 A1 | 7/2002 | Aust et al. |
| 2004/0142243 A1 * | 7/2004 | Furukawa et al. ............. 429/245 |

FOREIGN PATENT DOCUMENTS

| AR | 199770 | | 9/1974 |
| AR | 202193 | | 5/1975 |
| AR | 018946 | A1 | 12/2001 |
| CN | 1533617 | A | 9/2004 |
| EP | 1 496 556 | A1 | 1/2005 |
| JP | 58-204165 | A | 11/1983 |
| JP | 58204165 | A * | 11/1983 |
| JP | 60-009061 | A | 1/1985 |
| JP | 60-220652 | A | 11/1985 |
| JP | 1-060963 | A | 3/1989 |
| JP | 2000-513140 | A | 10/2000 |
| JP | 2004-527066 | A | 9/2004 |
| JP | 2005-44760 | A | 2/2005 |
| JP | 2005-510628 | A | 4/2005 |
| WO | WO 02/15296 | A2 | 2/2002 |
| WO | WO 03/088385 | A1 | 10/2003 |

OTHER PUBLICATIONS

Chinese Office Action dated Mar. 23, 2011 (and English translation thereof) in counterpart Chinese Application No. 200880007098.6.
Extended European Search Report (EESR) dated Dec. 27, 2011 (in English) in counterpart European Application No. 08846300.5.
R. David Prengaman; Challenges From Corrosion-Resistant Grid Alloys in Lead Acid Battery Manufacturing; Journal of Power Sources 95: 2001; pp. 224-233.
Argentine Office Action dated Aug. 14, 2012 issued in counterpart Argentine Application No. P080104843.

* cited by examiner

*Primary Examiner* — Weiping Zhu
(74) *Attorney, Agent, or Firm* — Holtz, Hotlz, Goodman & Chick PC

(57)    ABSTRACT

The present invention relates to a method for producing a lead-base alloy grid for lead-acid battery having excellent mechanical strength, corrosion resistance and growth resistance, including two-step heat treatment of a Pb—Ca—Sn alloy grid containing 0.06% by mass or less of calcium, the first heat treatment being conducted at a temperature of 40° C. to 110° C., the second heat treatment being conducted at a temperature of 90° C. to 140° C., and the first heat treatment being conducted at a lower temperature than the second heat treatment.

3 Claims, No Drawings

METHOD FOR PRODUCING LEAD-BASE ALLOY GRID FOR LEAD-ACID BATTERY

CROSS REFERENCE TO RELATED APPLICATIONS

This is a Continuation Application of PCT Application No. PCT/JP2008/070244, filed Oct. 30, 2008, which was published under PCT Article 21(2) in English.

This application is based upon and claims the benefit of priority from prior Japanese Patent Application No. 2007-287121, filed Nov. 5, 2007, the entire contents of which are incorporated herein by reference.

BACKGROUND OF THE INVENTION

1. Field of the Invention

The present invention relates to a method for producing a lead-base alloy grid for a lead-acid battery, the grid being useful for automotive batteries, VRLA batteries, industrial cycle use batteries, vented batteries and VRLA batteries for standby, cylindrical wound batteries, and the grid having excellent mechanical strength, corrosion resistance, and growth resistance.

2. Description of the Related Art

Recently, as the use of automobile trims has increased and the allowance of useless spaces has been reduced, engine rooms, in which lead-acid batteries for automobiles are placed, have become places of a higher temperature environment than before. In addition, lead storage batteries are always in the state of overcharge, so that they have a shorter life than other lead-acid batteries. Further, the Pb—Ca alloy grid introduced with the intention of obviating the necessity of maintenance has tended to cause the problem of growth, which is deformation of the anode grid by corrosion or elongation, and thus have a shorter life than conventional ones.

These problems such as corrosion and growth can be resolved by decreasing the Ca content in the Pb—Ca alloy substrate, but the decrease of the Ca content results in the decrease of Ca-containing intermetallic compounds such as $Pb_3Ca$ and $(Pb,Sn)_3Ca$ to cause the deterioration of the grid strength and deformation of the grid during pasting of an active material paste.

Then, it was attempted to decrease the Ca content in a Pb—Ca—Sn alloy, for example, from 0.09% by mass to 0.06% by mass, and then 0.04%, and compensate the loss with Ba or Ag thereby improve the strength. However, sufficient improvement of the mechanical strength was not achieved.

A method for improving the strength of a Pb—Ca—Sn alloy through natural aging is disclosed in R. D. Prengaman, J. Power Sources 95 (2001) 226. It is shown that an alloy containing 0.065% by mass of Ca requires aging treatment for 24 hours, and an alloy containing 0.045% by mass of Ca requires aging treatment for 14 days, and an alloy containing 0.025% by mass of Ca requires aging treatment for 60 days to achieve intended hardness. However, the method requires too much time for natural aging of an alloy containing lower Ca, and is thus insufficient to be practical.

Jpn. PCT National Publication No. 2004-527066 discloses a method for subjecting a Pb—Ca—Sn—Ag alloy containing 0.02 to 0.06% by mass of Ca to artificial aging at 100° C. for 3 hours. WO03/088385A1 discloses a method for subjecting a Pb—Ca—Sn—Ba—Ag alloy containing 0.02 to 0.05% by mass of Ca to heat, treatment at a temperature of 80 to 150° C. for a period of 0.5 to 10 hours within 1000 hours after casting the grid. However, these methods involve a wide range of mechanical variation, and the artificial aging may be ineffective. Therefore, these methods have problems with stability of plant operation.

In order to improve the mechanical strength of a Pb—Ca—Sn alloy grid containing a decreased amount of Ca, the inventors performed differential scanning calorimetry of a Pb—Ca—Sn alloy, and made a detailed investigation of the result. As a result of this, a broad region over a wide range was found in a temperature range lower than the range for known peaks, with this region being likely attributable to the heat generation process. The region is due to the deposition reaction of the precursor to be the deposit nuclear, and the deposit is considered to grow from the precursor as the nuclear.

On the basis of estimation, the inventors conducted a first heat treatment at low temperature thereby promoting the precursor formation, and then conducted a second heat treatment at high temperature to grow the deposit. As a result of this, the resultant Pb—Ca—Sn alloy grid exhibited improved mechanical strength.

Heretofore, artificial aging such as heat treatment, is regarded as accelerated natural aging for slowly depositing intermetallic compounds such as $Pb_3Ca$ and $Sn_3Ca$ from oversaturated solid solution by cooling after casting. The precursor herein is considered to be equivalent to the GP zone or intermediated phase deposit in an aluminum alloy. However, there is no report evidently showing the presence of the precursor in a lead alloy.

BRIEF SUMMARY OF THE INVENTION

The present invention is intended to provide a lead-base alloy grid for a lead-acid battery with excellent mechanical strength, corrosion resistance, and growth resistance.

An aspect of the present invention is a method for producing a lead-base alloy grid for lead-acid storage battery, including two-step heat treatment of a Pb—Ca—Sn alley grid containing 0.06% by mass or less of calcium. The first heat treatment is conducted at a temperature of 40° C. to 110° C., and the second heat treatment is conducted at a temperature of 90° C. to 140° C. The first heat treatment is conducted at a lower temperature than the second heat treatment.

According to the present invention, the Pb—Ca—Sn lead-base alloy grid is subjected to two-step heat treatment, wherein the first heat treatment forms a precursor to be the deposit nuclear, and the second heat treatment grows the precursor into a deposit. Accordingly, the deposition finely and quickly proceeds, and the resultant substrate has a high strength in spite of the Ca content that is as low as 0.06% by mass or less, and deformation during pasting of an active material is prevented. In addition, the Ca content in the Pb—Ca—Sn alloy used in the present invention is so low that the alloy has excellent corrosion resistance and growth resistance.

DETAILED DESCRIPTION OF THE INVENTION

The present invention relates to a method for producing a lead-base alloy grid for a lead-acid storage battery including two-step heat treatment of a Pb—Ca—Sn alloy grid containing 0.06% by mass or less of calcium, the first heat treatment being conducted at a temperature of 40° C. to 110° C., the second heat treatment being conducted at a temperature of 90° C. to 140° C., and the first heat treatment being conducted at a lower temperature than the second heat treatment.

In the present invention, the reason that the Ca content in the Pb—Ca—Sn lead-base alloy is defined as 0.06% by mass or less is that corrosion resistance and growth resistance of the grid are insufficient if the Ca content exceeds 0.06% by mass. The Ca content is even more preferably less than 0.05% by mass.

Regarding the heat treatment temperature, the reason that the first heat treatment temperature is defined as from 40° C. to 110° C. is that the formation of the precursor is not accelerated at temperatures lower than 40° C., and substantially no precursor is formed at temperatures higher than 110° C. If the heat treatment temperature is lower than 40° C. or higher than 100° C., the growth of the deposit by the second heat treatment and resultant strength improvement effect are not sufficiently achieved. The behavior of the precursor formation is substantiated by the result of the measurement of differential scanning calorie.

In the first heat treatment, if the heat treatment time is shorter than 0.5 hours, the formation of the precursor is insufficient, so that the strength improvement effect is insufficient. The period of the first heat treatment is preferably 0.5 hours or more. The heat treatment time may be appropriately adjusted in consideration of productivity so as not to be shorter than 0.5 hours, but if the period is 15 hours or more, the precursor may partially grow into a coarse deposit to show an overaged state. Accordingly, the first heat treatment time is preferably shorter than 15 hours.

In the present invention, the reason that the second heat treatment temperature is defined as from 90° C. to 140° C. is that the growth of the deposit is slow at temperatures lower than 90° C., and the deposit excessively grows at temperatures higher than 140° C. In both cases, sufficient mechanical strength cannot be achieved. If the second heat treatment time is shorter than 0.5 hours, the growth of the deposit is insufficient, and if longer than 10 hours, the deposit excessively grows. In both cases, sufficient mechanical strength cannot be achieved. Accordingly, the second heat treatment time is preferably from 0.5 hours to 10 hours.

In the present invention, the first heat treatment is conducted at a lower temperature than the second heat treatment. The reason for this is that the precursor is not sufficiently formed if the first heat treatment temperature is higher than the second heat treatment temperature, and thus enhancement of the deposition by the second heat treatment is not sufficiently achieved. The strength improvement effect can be increased by conducting natural aging before the first heat treatment. The period of natural aging is preferably 0.5 hours or more, and a period about 3 hours is sufficient. Even if the period is extended longer, the effect of the natural aging will not be improved. Thus, the preferable period is 0.5 hours or more, and further in terms of the productivity, a period of about 3 hours is appropriate.

In the present invention, the effect of two-step heat treatment on strength improvement is particularly good for a lead-base alloy containing 0.02% by mass or more and less than 0.05% by mass of calcium, 0.4% by mass or more and 2.5% by mass or less of tin, 0.005% by mass or more and 0.04% by mass or less of aluminum, and 0.002% by mass or more and 0.014% by mass or less of barium, the remainder being composed of lead and unavoidable impurities.

In the lead-base alley of the present invention, Ca enhances the mechanical strength of the alloy. If the Ca content is less than 0.02% by mass, the effect is insufficient, and if 0.05% by mass or more, corrosion resistance is impaired. In the alloy of the present invention, the Ca content is preferably from 0.03% to 0.045% by mass.

In the alloy of the present invention, Sn improves the flow of molten alloy and mechanical strength of the lead-base alloy. If Sn oozed out of the grid-active material interface is doped by the corrosion layer, the electrical conductivity of the grid-active material interface is improved by the semiconductor effect. If the Sn content is less than 0.4% by mass, the effect is insufficient and corrosion resistance deteriorates. If the Sn content is more than 2.5% by mass, the crystal grain of the lead-base alloy coarsen, which may result in corrosion of grain boundaries beyond apparent corrosion. The Sn content is more preferably from 0.6% to 2.5% by mass.

Al suppresses the loss of Ca and Ba caused by oxidation of molten metal. If the Al content is less than 0.005% by mass, the effect is insufficient, and if more than 0.04% by mass, Al tends to deposit as dross to deteriorate flow of molten alloy.

Ba improves the mechanical strength and corrosion resistance of the lead-base alloy. If the Ba content is less than 0.002% by mass, the effect is insufficient, and if more than 0.014% by mass, the corrosion resistance rapidly deteriorates. The Ba content is more preferably from 0.002% to 0.010% by mass.

When the lead-base alloy contains at least one selected from the group consisting of Ag, Bi, and Tl in an appropriate amount, the alloy has improved mechanical strength or creep properties (growth resistance) at high temperatures. Ag markedly improves mechanical strength, in particular high temperature creep properties. If the Ag content is less than 0.005% by mass, the effect is insufficient, and if more than 0.070% by mass, cracking may occur during casting. The Ag content is more preferably from 0.01% to 0.05% by mass. Bi contributes to the improvement of mechanical strength. The effect is lower than that of Ag, but Bi is economical because it is less expensive than Ag. If the Bi content is less than 0.01% by mass, the effect is insufficient, and if more than 0.10% by mass, corrosion resistance deteriorates. The Bi content is more preferably from 0.03% to 0.05% by mass. Tl contributes to the improvement of mechanical strength. Tl is inexpensive and thus economical. If the Tl content is less than 0.001% by mass, the effect is insufficient, and if more than 0.05% by mass, corrosion resistance deteriorates. The Tl content is more preferably from 0.005% to 0.05% by mass.

In the present invention, the lead-base alloy grid is preferably made by gravity casting, continuous casting, die casting, or rolling. Any of these processes produces a lead-base alloy grid having excellent mechanical strength, corrosion resistance, and growth resistance. The lead-base alloy of the present invention exhibits the same effect when it is used for lead components other than substrates.

Example 1

Each of the molten metals of the lead-base alloys (A) to (H) having the compositions shown in Table 1 was gravity-cast under a book mold system to make strap samples having a length of 200 mm, a width of 15 mm, and a thickness of 1.5 mm at a rate of 15 pieces per minute. The samples were subjected to two-step heat treatment thereby producing lead-base alloy grids for a lead storage battery. The first and second heat treatments were conducted under the conditions defined in the present invention. The period of natural aging after casting to the initiation of heat treatment was variously changed. Each of the resultant lead-base alloy grids was measured for its hardness using a micro Vickers indenter under the conditions of a load of 25 gf and a load retention time of 15 seconds. Those exhibiting a hardness of 12 or more were evaluated as having excellent mechanical strength.

As comparative examples, lead-base alloy grids for a lead-acid battery were made in the same manner as Example 1, except that the conditions of the first heat treatment were different from those defined in the present invention, and the grids were measured for their hardness to examine their mechanical strength in the same manner as Example 1. The results of Examples and Comparative Examples are shown in Table 2.

TABLE 1

| Alloy | Ca | Sn | Al | Ba | Ag | Bi | Tl |
|---|---|---|---|---|---|---|---|
| A | 0.055 | 1.0 | 0.008 | — | — | — | — |
| B | 0.040 | 1.0 | 0.008 | — | — | — | — |
| C | 0.040 | 1.0 | 0.008 | 0.007 | — | — | — |
| D | 0.035 | 1.0 | 0.010 | 0.007 | — | — | — |
| E | 0.040 | 1.0 | 0.010 | 0.007 | — | — | — |
| F | 0.040 | 1.0 | 0.010 | 0.007 | 0.02 | — | — |
| G | 0.040 | 1.0 | 0.010 | 0.007 | — | 0.03 | — |
| H | 0.040 | 1.0 | 0.010 | 0.007 | — | — | 0.01 |

Note)
unit: % by mass

TABLE 2

| Example | No. | Alloy | Natural aging time | Heat treatment conditions First step | Heat treatment conditions Second step | Hardness |
|---|---|---|---|---|---|---|
| Example 1 | 1 | A | 1 h | 70° C. × 1 h | 120° C. × 3 h | 17 |
|  | 2 | B | 1 h | 70° C. × 1 h | 120° C. × 3 h | 13 |
|  | 3 | C | 1 h | 70° C. × 1 h | 120° C. × 3 h | 15 |
|  | 4 | D | 1 h | 70° C. × 1 h | 120° C. × 3 h | 14 |
|  | 5 | E | 1 h | 70° C. × 1 h | 120° C. × 3 h | 18 |
|  | 6 | F | 1 h | 70° C. × 1 h | 120° C. × 3 h | 19 |
|  | 7 | G | 1 h | 70° C. × 1 h | 120° C. × 3 h | 20 |
|  | 8 | H | 1 h | 70° C. × 1 h | 120° C. × 3 h | 20 |
|  | 9 | E | 1 h | 40° C. × 0.5 h | 120° C. × 3 h | 16 |
|  | 10 | E | 1 h | 40° C. × 1 h | 120° C. × 3 h | 17 |
|  | 11 | E | 1 h | 50° C. × 1 h | 120° C. × 3 h | 18 |
|  | 12 | E | 1 h | 90° C. × 1 h | 120° C. × 3 h | 19 |
|  | 13 | E | 1 h | 110° C. × 1 h | 120° C. × 3 h | 18 |
|  | 14 | E | 1 h | 70° C. × 1 h | 90° C. × 3 h | 17 |
|  | 15 | E | 1 h | 70° C. × 1 h | 140° C. × 3 h | 16 |
|  | 16 | E | 0.1 h | 70° C. × 1 h | 120° C. × 3 h | 12 |
|  | 17 | E | 0.5 h | 70° C. × 1 h | 120° C. × 3 h | 18 |
|  | 18 | E | 1 h | 70° C. × 1 h | 120° C. × 3 h | 20 |
|  | 19 | E | 3 h | 70° C. × 1 h | 120° C. × 3 h | 21 |
|  | 20 | E | 4 h | 70° C. × 1 h | 120° C. × 3 h | 21 |
|  | 21 | E | 7 h | 70° C. × 1 h | 120° C. × 3 h | 21 |
| Comparative Example 1 | 22 | E | 1 h | 30° C. × 1 h | 120° C. × 3 h | 11 |
|  | 23 | E | 1 h | 120° C. × 1 h | 120° C. × 3 h | 11 |
| Comparative Example 2 | 24 | E | 1 h | — | 120° C. × 3 h | 10 |

As is evident from Table 2, the alloy grids of No. 1 to No. 21 according to the example of the present invention had hardness of 12 or more, indicating their excellent mechanical strength. The result is due to the fact that the first and second heat treatments were conducted under the conditions defined in the present invention, so that the precursor of a Ca-containing deposit successfully occurred and grew to a deposit. The results shown in Table 2 indicate the effect of Ca (comparison between No. 1 and No. 2), the effect of Ba (comparison between No. 2 and No. 3), and the effects of Ag, Bi, and Tl (No. 6 to No. 8) on mechanical strength.

The evaluations of No. 16 to 21 shown in Table 2 indicate that hardness increased as the natural aging time was increased up to 3 hours, but the hardness reached a level of saturation and did not increase thereafter. It should be noted here that the period of natural aging is preferably 0.5 hours or more, and a period about 3 hours is sufficient. Even if the period is extended longer, the effect of the natural aging will not be improved. Thus, the preferable period is 0.5 hours or more, and further in terms of the productivity, a period of about 3 hours is appropriate.

On the other hand, No. 22 and 23 of Comparative Example 1 exhibited inferior mechanical strength because they were subjected to the first heat treatment at a tempera cure not defined in the present invention. No. 24 also exhibited inferior mechanical strength because it was not subjected to the first heat treatment.

Example 2

Each of the samples of the present invention (No. 1 to 21 of Example 1), and a known lead-base alloy grid (Pb: 0.07% by mass, Ca: 1.0% by mass, Sn: 0.01% by mass, Al alloy) were examined for corrosion resistance and high temperature creep properties. In order to examine corrosion resistance, the sample was anodized in a dilute sulfuric acid aqueous solution having a specific gravity of 1.280 (20° C.) and a temperature of 60° C. for 720 hours at a constant potential of 1350 mV (vs. $Hg_2SO_4$), and then the corrosion weight loss for a unit area of the sample was measured. The corrosion weight loss of the samples of the present invention was 20 mg/cm$^2$ or less, indicating their excellent corrosion resistance.

In order to examine high temperature creep properties, the sample was subjected to a load of 16.5 MPa, then heated to 100° C., and the time until the rupture of the sample was measured. As a result of this, the samples of the examples of the present invention took 25 hours or more until they ruptured, indicating their excellent high temperature creep properties (growth resistance).

On the other hand, the Ca content in the known lead-base alloy was as high as 0.07% by mass, so that the corrosion weight loss was 35 mg/cm$^2$, and the time until the rupture of the sample was 14 hours, indicating that the substrate has inferior corrosion resistance and high temperature creep properties (growth resistance).

What is claimed is:
1. A method for producing a lead-base alloy grid for a lead-acid battery, comprising:

casting a Pb—Ca—Sn alloy grid containing 0.06% by mass or less of calcium, performing natural aging of the Pb—Ca—Sn alloy grid, and performing heat treatment of the Pb—Ca—Sn alloy grid after conducting the natural aging, the heat treatment being conducted in a two step process including a first heat treatment step and a second heat treatment step, wherein the first heat treatment step is conducted at a temperature of 40° C. to 110° C. for a period of at least 0.5 hours, wherein the second heat treatment step is conducted at a temperature of 90° C. to 140° C. for a period of 0.5 hours to 10 hours, wherein the first heat treatment step is conducted at a lower temperature than the second heat treatment step, and wherein the natural aging is conducted for a period of 0.5 hours to about 3 hours.

2. The method for producing a lead-base alloy grid for a lead-acid battery of according to claim 1, wherein the Pb—Ca—Sn alloy comprises 0.02% by mass or more and less than 0.05% by mass of calcium, 0.4% by mass or more and 2.5% by mass or less of tin, 0.005% by mass or more and 0.04% by mass or less of aluminum, and 0.002% by mass or more and 0.014% by mass or less of barium, the remainder being composed of lead and unavoidable impurities.

3. The method for producing a lead-base alloy grid for a lead-acid battery according to claim 1, wherein the Pb—Ca—Sn alloy comprises 0.02% by mass or more and less than 0.05% by mass of calcium, 0.4% by mass or more and 2.5% by mass or less of tin, 0.005% by mass or more and 0.04% by mass or less of aluminum, 0.002% by mass or more and 0.014% by mass or less of barium, and at least one element selected from the group consisting of 0.005% by mass or more and 0.070% by mass or less of silver, 0.01% by mass or more and 0.10% by mass or less of bismuth, 0.001% by mass or more and 0.05% by mass or less of thallium, the remainder being composed of lead and unavoidable impurities.

* * * * *